United States Patent [19]

Okada et al.

[11] 4,166,692

[45] Sep. 4, 1979

[54] PROTECTION AND SAFETY DEVICE FOR A PHOTOCOPYING MACHINE

[75] Inventors: Osamu Okada, Toyokawa; Shunji Yamamoto, Shinshiro, both of Japan

[73] Assignee: Minolta Camera Kabushiki Kaisha, Osaka, Japan

[21] Appl. No.: 831,674

[22] Filed: Sep. 8, 1977

[30] Foreign Application Priority Data

Sep. 14, 1976 [JP] Japan .............................. 51-111070

Sep. 16, 1976 [JP] Japan .............................. 51-126041[U]

[51] Int. Cl.$^{2}$ ...................... G03G 15/00; G03B 27/76

[52] U.S. Cl. ...................................... 355/14; 355/3 R; 355/71

[58] Field of Search ...................... 355/3 R, 14, 67, 71

[56] References Cited

U.S. PATENT DOCUMENTS

| | | | |
|---|---|---|---|
| 3,575,503 | 4/1971 | Van Auken et al. | 355/8 |
| 3,692,401 | 9/1972 | Kawai | 355/3 R |
| 3,724,942 | 4/1973 | Gibson et al. | 355/3 R |
| 3,807,856 | 4/1974 | Rodriguez | 355/67 |
| 4,045,135 | 8/1977 | Doi et al. | 355/14 X |
| 4,074,934 | 2/1978 | Satomi | 355/14 |

*Primary Examiner*—Fred L. Braun

*Attorney, Agent, or Firm*—Wenderoth, Lind & Ponack

[57] ABSTRACT

Protection and safety device by which damage due to undesired exposure of photosensitive medium in a photocopying machine when the photocopying machine is switched off is prevented. A light blocking member is moved into the optical path for exposing the photosensitive medium when the light source and power source, respectively, for the copying machine are turned off and a cover portion for the machine is unlatched to prevent an undesired exposure of the medium and moved out of the optical path when the cover portion is latched and the light source and power source, respectively, are turned on to permit an exposure to take place.

10 Claims, 11 Drawing Figures

F/G. 3

PROTECTION AND SAFETY DEVICE FOR A PHOTOCOPYING MACHINE

The present invention relates to protection and safety device for a photocopying machine. More particularly the invention relates to an improved protection and safety device which prevents damage or deterioration of the quality of a photosensitive medium during the time a photocopying machine is not in use.

Normally, in a photocopying machine, light reflected from an original document illuminated by a light source is directed by an optical system along a path leading to an electrophotosensitive medium, which is generally constituted by the outer surface of a drum or belt which is moved in a rotating path to bring successive portions of the electrophotosensitive medium to a charging station whereat a generally uniform electrical charge is imposed on the electrophotosensitive medium, an exposure station whereat the medium is exposed to image light from the original document, whereby an electrostatic latent image of the original document is formed on the electrophotosensitive medium, a transfer station whereat the image is transferred onto copy paper which is brought into pressure contact with the electrophotosensitive medium by transfer roll means, and to a charge removal station for removal of charge from the medium prior to production of a subsequent copy. The image of the original document may be developed, by a stream of toner particles, for example, prior to or after transfer thereof onto the copy paper, and to avoid the necessity of cleaning the easily damaged electrophotosensitive medium, it is preferably developed after transfer. Also, rather than causing instantaneous projection of the entire image of the original document onto the electrophotosensitive medium, it is usually preferred to move the electrophotosensitive medium continuously during the photocopying process and to direct onto successive portions of the medium which are brought to the exposure station image light from successive portions of the original document, which is moved to bring successive portions thereof to an image projection station, or which is held stationary while successive portions thereof are scanned by a slit element, constituting, so to speak, a moving projection station.

In such a construction, since light from the projection station must be allowed to reach the electrophotosensitive medium, when the photocopying machine is not in use and the projection station is not covered by an original document there is a risk of external light passing through the projection station and being transmitted by the optical system to the electrophotosensitive medium. Since the electrophotosensitive medium is stationary at this time, such external light is transmittable to only one portion thereof, resulting in deterioration or change of the qualities of that portion of the medium with respect to other portions thereof.

To avoid this problem when the photocopying machine is, or can be, used for copying what are effectively thick original documents, e.g., pages of a book, it is known to provide a movable lightproof frame which may be moved manually or automatically to above the projection station when the photocopying machine is switched off. However, apart from making the photocopying machine bulkier, such a frame has the disadvantages that, when the frame is moved manually, it is easily forgotten, or, if it is anticipated that the photocopying machine will be used shortly afterwards, moving the frame into place is deliberately neglected, or that, when the frame is moved automatically, a complex construction and actuation means are required.

If the photocopying machine is a type for obtaining photocopies only of thin original documents, in the form of single sheets, for example, it is common practice to employ a rubber sheet to cover an original document during the photocopying process, and to cover the image projection station when the photocopying machine is not in use. Although this means is very simple, again it is possible to forget to replace the rubber sheet correctly when the photocopying machine is switched off, and also the means is obviously unsuited for a photocopying machine employed for obtaining photocopies of thick original documents.

It is accordingly an object of the invention to provide a means having a simple construction which upon switching-off of a photocopying machine automatically prevents damage to an electrophotosensitive medium by external light.

In accomplishing these and other objects, there is provided a photocopying machine of the transfer type, in which light reflected from an original document to be copied and illuminated by a light source is directed by an optical system along a path leading to an electrophotosensitive medium which is exposed to form an electrostatic latent image of the original document thereon, comprising light blocking means provided adjacent said path and movable to a first position wherein said blocking means blocks passage of light along said path and to a second position wherein said blocking means is out of said path of light to said electrophotosensitive medium, and control means actuable for holding said blocking means in said second position at least upon actuation of said light source and in said first position at least in the off position of the power source of said photocopying machine.

Another problem relating to protection and safety which is encountered in a photocopying machine is that of avoiding actuation of the photocopying machine elements when the machine is opened, for example by lifting off or opening a top cover with which the machine is provided. This is easily effected by switching off the main power switch of the photocopying machine. Specialist staff carrying out repair or maintenance work on a photocopying machine may be expected to switch off the main switch before opening the machine. However, it may often be required to open the machine for minor correction, e.g., release of jammed copy paper, by office staff, who may not always remember to switch off the main switch. To avoid danger in the latter case, it is the practice to provide a microswitch which is actuated by the photocopying machine cover to close the power supply and control circuit of the photocopying machine only when the cover of the machine is closed, and to open the circuit when the cover is opened. With this means, therefore, the power supply circuit is automatically opened when the photocopying machine is opened, even if it is forgotton to switch off the main switch. If, however, it is forgotten to switch off the main switch before the cover is opened, there is the risk of a person who is removing jammed copy paper, etc., unintentionally actuating the microswitch, thus closing the power supply and control circuit and actuating the photocopying machine, and possibly causing an accident. Also when the main switch is left switched on, even if the microswitch is not accidentally actuated, all that is required for closure of the power supply and control circuit is actuation of the microswitch, and this actuation is effected immediately when the cover is reclosed, with the result that there may be undesired actuation of the photocopying machine and damage or further jamming therein.

It is accordingly another object of the invention to provide a protection and safety device for a photocopying machine which prevents opening of the photocopying machine cover unless the main switch of the machine is switched off, and which makes it impossible to switch on the main switch of the machine while the cover of the machine is opened.

According to the preferred embodiment of the present invention, there is provided a photocopying machine protection and safety device comprising lever elements which are actuated together in response to movement of the main switch of the photocopying machine. One lever element engages and prevents opening of the cover of the photocopying machine while the main switch is switched on, thus making it necessary to switch off the main switch to permit opening of the cover. When the main switch is switched off, a light blockage element is moved into the path over which image light is directed in order to expose an electrophotosensitive medium during photocopying operations, and a lever element which connects to the main switch is held in a fixed position, whereby external light is prevented from reaching the photosensitive medium, and the main switch cannot be switched on until the cover is reclosed. Also, in response to switch-off of the main switch the lever elements move a transfer roll out of contact with the electrophotosensitive medium, and, in a photocopying machine employing fluid developer, supply of the developer is stopped until the main switch is switched on again. According to another embodiment of the invention, the light blockage means is normally held in the light path from the projection station to the exposure station, and is moved out of this path upon commencement of a photocopying process.

In addition, it is to be noted that there is provided a means for adjusting the amount of light for exposing the electrophotosensitive medium to form an electrostatic latent image of the original document thereon apart from a conventional shutter plate, and, in the embodiments of the invention, said means is constituted by a voltage regulator connected to a light source for illuminating said original document and externally actuable to adjust the intensity of the light source in a known manner.

A better understanding of the present invention may be had from the following full description thereof when read in reference to the attached drawings, in which like numbers refer to like parts, and in which.

Figure 1:
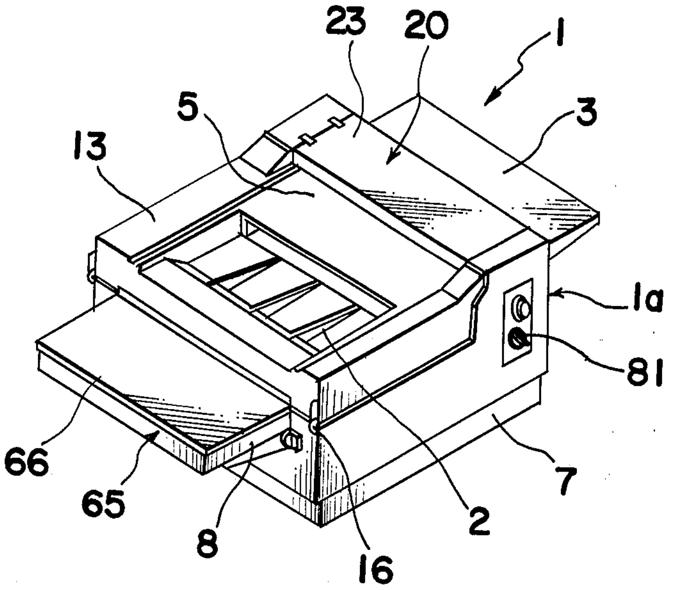
FIG. 1 is a perspective view of an example of a photocopying machine in which a protection and safety device according to the invention can be employed.
Figure 2:
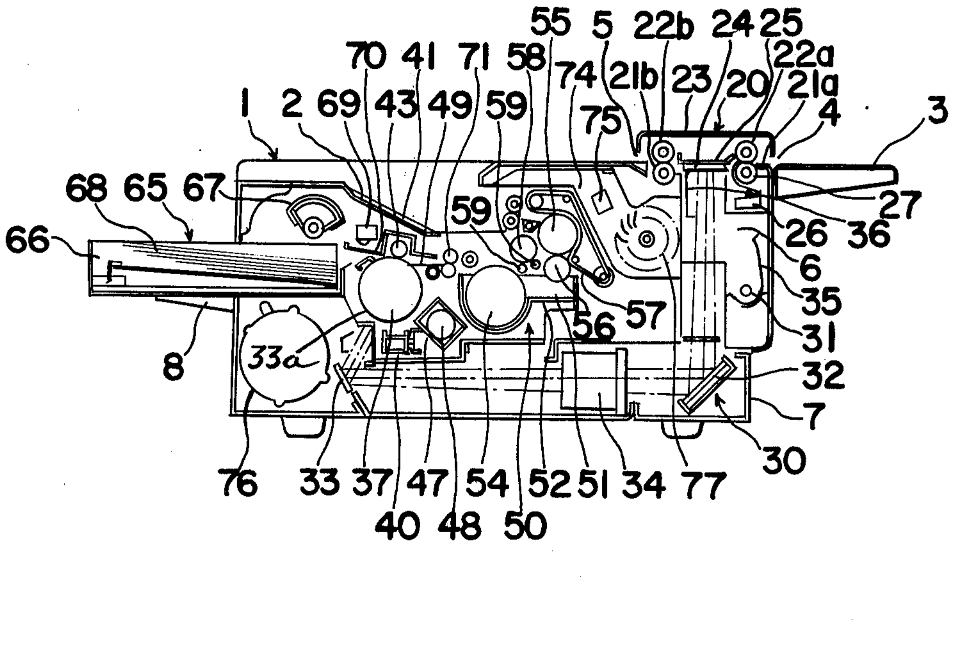
FIG. 2 is a cross-sectional view of the photocopying machine of FIG. 1.

Referring initially to FIGS. 1 and 2, there is shown a photocopying machine 1 which is an example of equipment in which the means of the invention may be suitably employed, and which is a photocopying machine for production of photocopies by an electrostatic image transfer process, it being understood that the device of the invention is equally suited to employment in other types of photocopying equipment. Photocopying machine 1 comprises main housing 1*a*, which accommodates photocopying process elements described below, and on the front side wall of which, as seen by a person using photocopying machine 1, there is provided a main switch 81, which is of the rotary dial type, and is movable to an on position to connect, and to an off position to cut power supply to the control circuit of the photocopying machine 1. From one end of housing 1*a*, the right end as seen in FIG. 1 and subsequent drawings, there extends an original document table 3, on which an original document to be copied is initially placed, and from which a document may be drawn through transport unit 20 comprising drive rolls 21*a* and 21*b*, follower rolls 22*a* and 22*b*, supplementary light-proof cover 23, glass plate 24 and guide board 25. Drive rolls 21*a* and 21*b* are disposed in horizontal, left-to-right alignment with one another, are rotatably supported in the upper right-hand portion of main housing 1*a*, and are caused to rotate by transmission means not shown connected to motor 76 provided in a lower left-hand portion of the interior of main housing 1*a*. Glass plate 24, which defines an image projection station, is disposed horizontally between rolls 21*a* and 21*b* so that the upper surface thereof is generally level with the uppermost peripheral portions of rolls 21*a* and 21*b*. Supplementary cover 23 extends between the front and rear side walls of housing 1*a*, has follower rolls 22*a* and 22*b* rotatably mounted therein and guide board 25 fixedly mounted therein, and has one end in hinged attachment to a wall of housing 1*a*, whereby supplementary cover 23, together with follower rolls 22*a* and 22*b* and guide board 25, may be moved to the closed position shown in the drawings, or be pivoted to an open position completely clear of the rolls 21*a* and 21*b* and glass plate 24.

When the original document to be copied is a single sheet or other thin document, cover 23 is closed, thus bringing follower rolls 22*a* and 22*b* into contact with drive rolls 21*a* and 21*b*, respectively, and bringing guide board 25 to just above glass plate 24. In this case, the document is drawn from table 3 by rolls 21*a* and 22*a* through an inlet opening 4 defined between the right-hand end wall of supplementary cover 23 and the top of housing 1*a*, moved between guide board 25 and glass plate 24, and is then engaged by rolls 21*b* and 22*b* and moved thereby through an exit opening 5, which is defined between the top of housing 1*a* and the left-hand end wall of supplementary cover 23, onto an uncovered portion of the upper surface of housing 1*a* for reception of the original document.

If the original document to be copied is part of a book or other thick document, cover 23 is moved to the open position, and the document is placed on a movable glass support, not shown, which contacts and is moved past the image projection station by rollers 21*a* and 21*b*, and the movement is kept rectilinear by suitable side guide roller means, not shown.

Upon moving past drive roller 21*a*, the leading edge of an original document, or document support trips actuator 27 and actuates microswitch 26, which is provided in the upper portion of opaque case 6 which is located below transport unit 20, constitutes a portion of the right-hand end wall of housing 1*a*, and also accommodates light sources 31 and reflector 35 provided around light source 31. Actuation of microswitch 26 closes a control circuit of known configuration, which is of a type which remains closed for a set time, for example, and which causes light source 31 to light, causes rotation of photosensitive drum 37, located somewhat left of the central portion of the interior of housing 1*a*, and also causes rotation of quadrant roll 67 which is provided above copy paper supply unit 65 mounted in, and extending to the left and right of the left-hand end wall of housing 1*a*. Also, the light source 31 is provided with a voltage regulator not shown and externally actuatable to adjust the intensity of the light source in a known manner for the purpose of adjusting the amount of light directed to the electrophotosensitive drum 37 to form an electrostatic latent image of the original document thereon.

Light emitted by light source 31 is directed by reflector 35 to the image projection station, and light carrying the image of successive portions of an original document moved into line with the projection station is reflected vertically downwards onto mirror 32, which is disposed at an angle of 45° to the horizontal, and which, together with mirror 33 and focussing lens 34 in horizontal line therewith, forms an optical system 30 for transmission of exposure light. There are suitably provided lightproof partition wall means, not shown, between the projection station and mirror 32. Optical system 30 is accommodated in base block 7 which constitutes a lightproof compartment and constitutes a portion of the base of housing 1*a*. Image light from the projection station is directed by mirror 32 through focussing lens 34 to mirror 33 which is disposed at an angle somewhat greater than 45° to the horizontal, and directs the image light onto currently rotating drum 37, whereby a focussed image of successive portions of the original document is directed onto successive portions of drum 37 brought to an exposure station 33*a* defined by wall elements not shown.

Prior to exposure thereof to image light, successive portions of the photosensitive drum are moved past residual charge removal station 47 which includes eraser lamp 48 for removal of a charge imposed on drum 37 during production of a previous copy, and then past corona charging unit 40 which imposes a generally uniform electrical charge on the surface of drum 37. After exposure thereof, successive portions of drum 37 are brought to a transfer station 41, which is described in greater detail below, and whereat the successive exposed portions are brought into pressure contact with successive portions of a sheet of copy paper 68 by means of transfer roller 43 which is pressed towards and is suitably held at a particular electrical potential with respect to drum 37.

Supply unit 65, from which copy paper 68 is supplied, comprises cassette 66 in which sheets of copy paper 68 are stored with the sensitive surfaces thereof facing downwards, and the above mentioned quadrant roll 67, which is connected to motor 76 by clutch means not shown, and is rotated one complete revolution, counterclockwise as seen in the drawing, for each copying process, whereby just one sheet of copy paper 68 is moved rightwards out of cassette 66. Adjacent the exit of cassette 66, and in the path over which copy paper 68 is transported, there is an actuator 70 which is tripped by copy paper 68 moving out of cassette 66 and which actuates a microswitch 69 which, in combination with microswitch 26 adjacent projection station 24*a*, serves to close circuits for actuation of development station elements and copy paper transport and drying elements described below. The control circuit of photocopying machine can be a circuit the actuation of which to time-controlled, as noted earlier, or which can be actuated in response to actuation of various other microswitches provided along the path over which copy paper 68 is transported through photocopying machine 1.

After passing actuator 70, copy paper 68 is engaged by and passed between transfer roller 43 and drum 37, whereby a latent image of the original document is transferred onto copy paper 68, which is then stripped from drum 37 by stripper fingers 49, forwarded by forwarding rollers 71 to development station 50, where it is brought into contact with developer roller 54, which rotates in developer fluid tank 52 containing developer fluid 51, which consists of or includes toner particles, for example, and is transferred by roller 54 onto copy paper 68, to which it adheres in a pattern corresponding to the image of the original document. After leaving development station 50, copy paper 68 is passed between soaking roller 58 and squeezing bar elements 59, which remove excess developer fluid from copy paper 68, and then between large diameter reversing roller 55 and small diameter soaking roller 56. Copy paper 68 is carried upwards, around part of the periphery of roller 55, between roller 55 and belt 57, which is driven round an endless path and contacts this part of the periphery of roller 55, whereby the side of copy paper 68 which carries the developed image of the original document is brought uppermost, after which copy paper 68 is supplied onto an outlet tray 2 on the upper surface of housing 1*a*.

To prevent overheating of casing 6 by light source 31, there is provided on the inner side of casing 6, below rolls 21*b* and 22*b*, exhaust fan 77 which draws air through air passages, not shown, in the walls of casing 6, and directs the air through duct 74 which is defined in the upper part of photocopying machine, contains supplementary heating source 75, and directs exhaust air onto tray 2, for drying copy paper 68 on tray 2.

Access to internal elements of photocopying machine 1 may be had by raising main cover 13, which, as shown in FIG. 1, defines the main portion of the upper surface and a portion of the upper front, rear, and left-hand side wall surfaces of main housing 1*a*, and is attached to the rest of housing 1*a* by hinges 16 permitting cover 13 to be pivoted to open or closed positions. When closed, cover 13 is suitably retained by lock means not shown, and may also be held in a closed position by a portion of the means of the invention described later.

Figure 3:
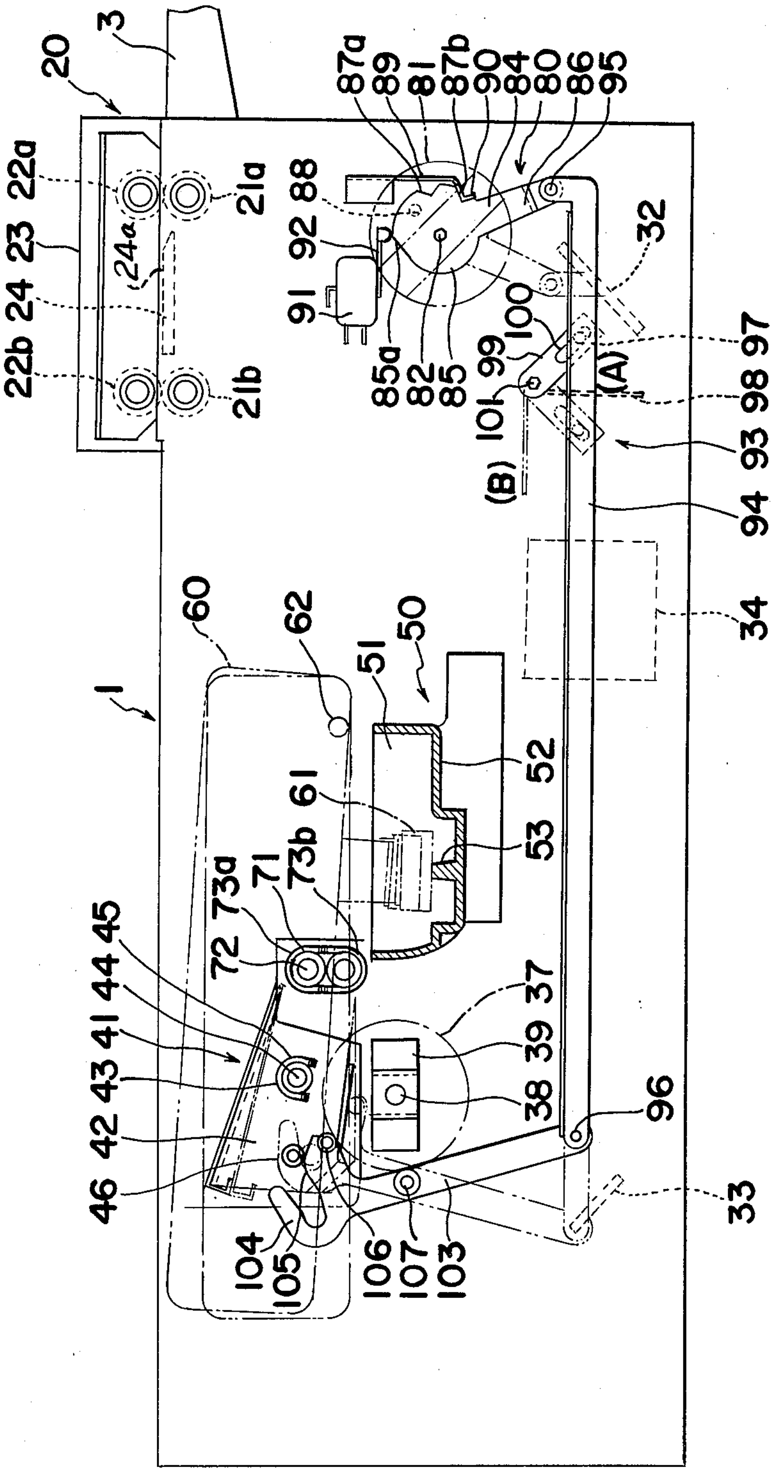
FIG. 3 is a schematic side elevation view of the photocopying machine showing the device of the invention.

Referring to FIGS. 2 and 3, forwarding rolls 71 are urged towards one another by coil springs 73*a* and 73*b* and are fixedly mounted on rotatable shafts 72, at least one of which is driven by motor 76.

Figure 7:
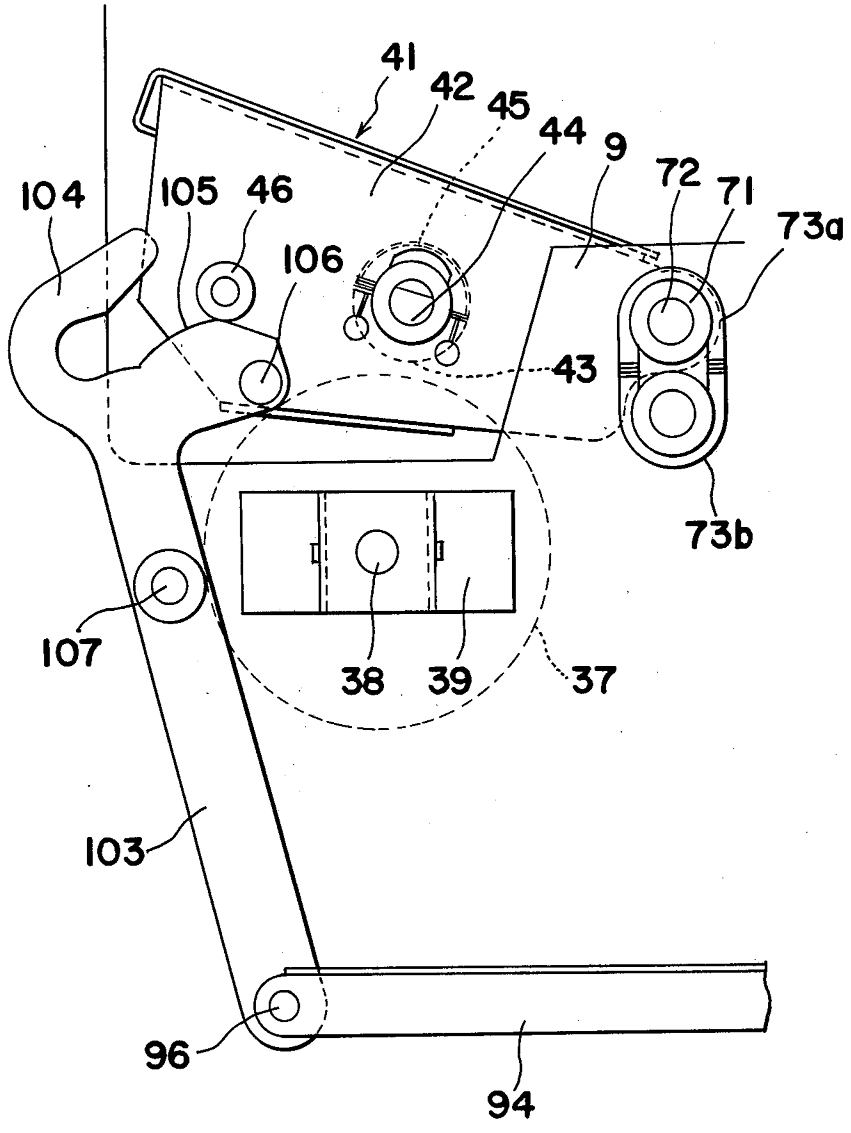
FIG. 7 is a side elevation view of transfer unit elements and disengagement lever elements employed in the device of the invention.
Figure 8:
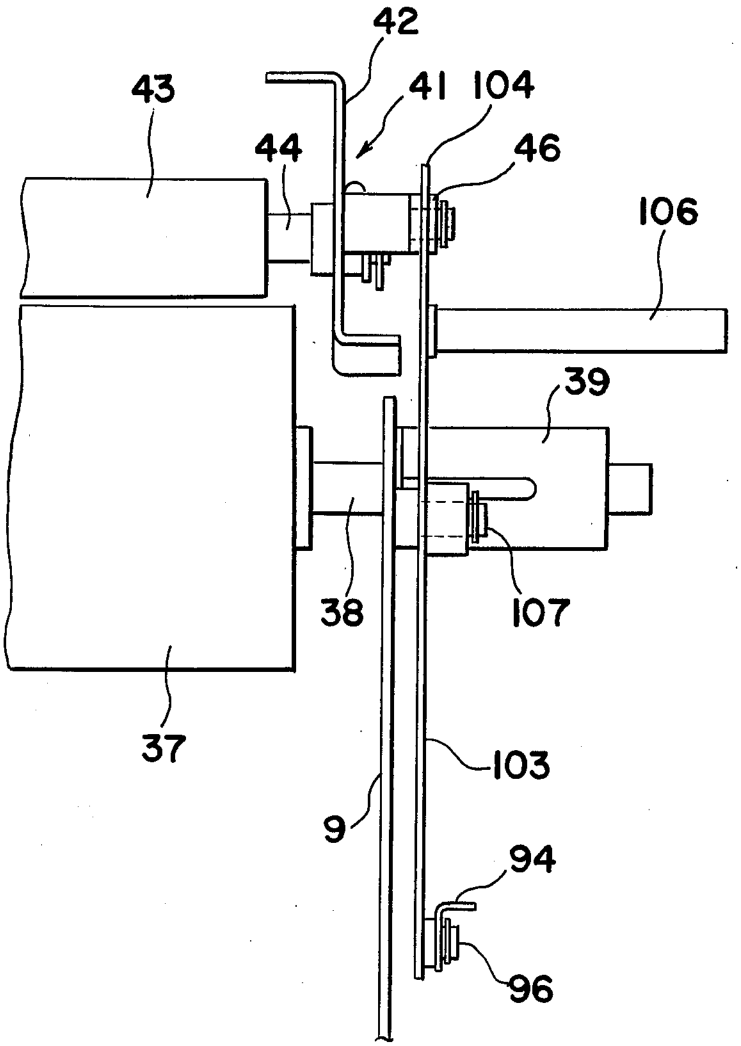
FIG. 8 is an end view of the elements of FIG. 7.

In FIGS. 3, 7 and 8, photosensitive drum 37 contactable by transfer roller 43 is rotated by shaft 38, which is supported at opposite ends by bearings 39 mounted on walls of housing 1a. Transfer roller 43 has associated therewith coil spring 45 for bringing roller 43 into pressure contact with photosensitive drum 37 and is rotatably supported on support shaft 44 mounted in frame 42, the lower right-hand corner portion of which is rotatably supported on shaft 72 of the upper forwarding roll 71, whereby frame 42 can be moved, counterclockwise as seen in the drawings, to a position in which transfer roller 43 is brought into contact with drum 37, or to a position in which transfer roller 43 does not contact drum 37, frame 42 being shown in this latter position in FIG. 3. Frame 42 is normally urged to the former position by the weight of the transfer station elements carried thereby, and optionally also by spring elements, not shown, attached to frame 42 and portions of housing 1a. Frame 42 is moved from this normal position by a lever 103, which is described in greater detail below, and has an upper curved surface 105 which contacts roller 46 that is rotatably mounted in a lower left-hand corner portion of frame 42.

Referring more particularly to FIG. 3, developer fluid 51 is suppliable at a requisite rate to developer fluid tank 52 from reservoir 60 via valve 61 connected to reservoir 60. Reservoir 60 is provided above developer fluid tank 52 and has a lower right-hand corner portion pivotally mounted on a fixed shaft 62 supported by walls of housing 1a and a left hand portion of the lower surface thereof contacts or is connected to rod 106 attached to lever 103. Valve 61 projects downwardly into tank 52 and, when reservoir 60 is in a horizontal position as indicated by the two-dot chain line portion of FIG. 3, is contacted and opened by a valve actuator projection 53 provided in the bottom of developer fluid tank 52. When reservoir 60 is tilted and lifted from the horizontal, in a manner described below, valve 61 moves out of contact with projection 53 and closes.

Figure 4:
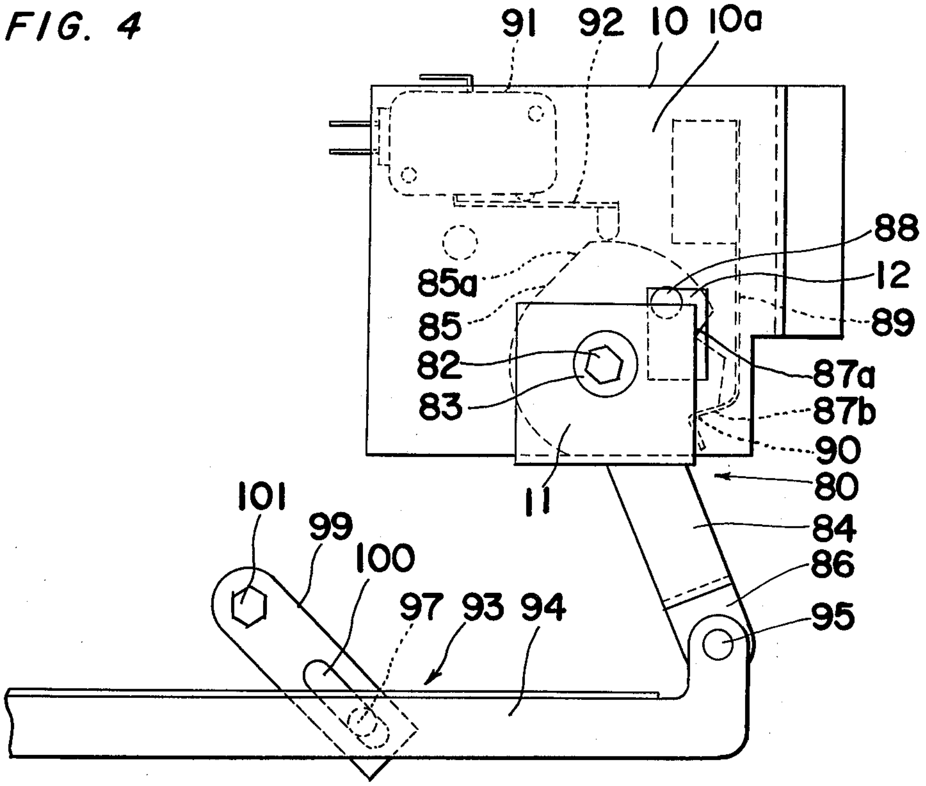
FIG. 4 is a side view of elements of a light blockage assembly employed in the device of the invention.
Figure 5:
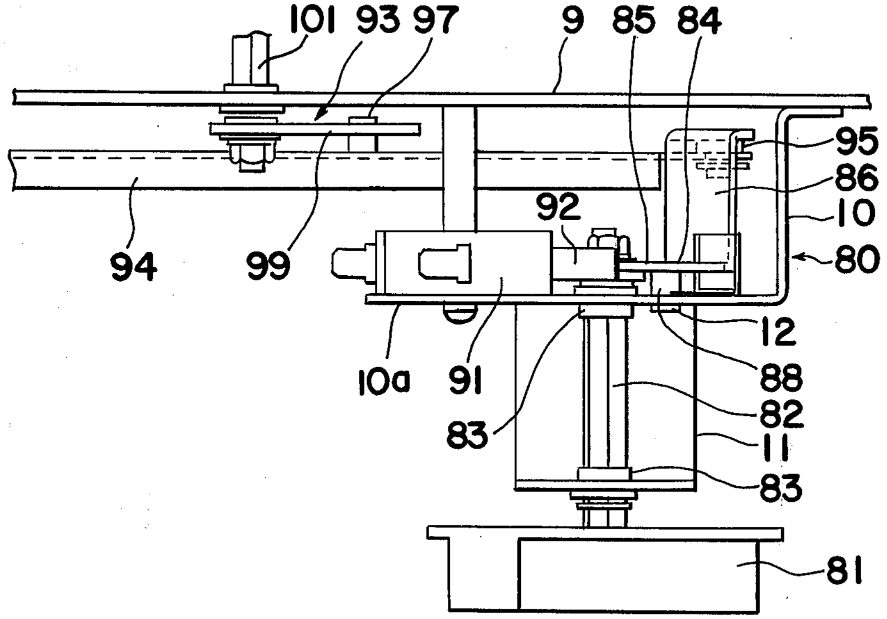
FIG. 5 is a plan view of the elements of FIG. 4.

Referring to FIGS. 3, 4 and 5, main switch 81 which is constituted as a rotary dial type switch, as noted earlier, is fixedly mounted on the outer end of support shaft 82 which extends rearwardly at right angles to the front side wall of main housing 1a, and is rotatably supported and extends through bearings 83, one of which is mounted on the outer plate 10a of support bracket 10 affixed to main housing wall 9, and the other of which is mounted at the front end of switch support frame 11 having a rear end affixed to outer plate 10a of support bracket 10. A cam element 85, which has a maximum radius portion 85a and two adjacent indented portions 87a and 87b and is in fixed or integral attachment to a downwardly extending lever element 84, is fixedly mounted on the inner end of switch support shaft 82, whereby cam element is turned by switch 81, clockwise or counterclockwise as seen in FIGS. 3 and 4. Cam element 85 and lever element 84 constitute part of control means 80.

Either indented portion 87a or indented portion 87b of cam element 85 is engaged by the bent end 90 of click spring 89, the opposite end of which is affixed to a fixed support block and which is urged by its spring force towards cam element 85, whereby, in the absence of externally applied force on switch 81, click spring 89 will fixedly hold cam element 85 in a first position in which cam element has been turned counterclockwise and indented portion 87b is engaged by click spring engagement end 90, or to a second position in which cam element 85 has been turned clockwise and engagement end 90 engages indented portion 87a, cam element 85 being shown in the first position in FIGS. 3 and 4.

When cam element 85 is in the first position, the major diameter portion 85a thereof presses against actuator 92 and causes actuator 92 to actuate microswitch 91, which thereupon opens the control and power supply circuit of photocopying machine. When cam element 85 is in the second position it does not contact actuator 92, which is moved, by spring force, for example, away from microswitch 91, resulting in closure of the control and power supply circuit of machine 1.

The lower end of lever element 84 attached to cam element 85 is moved to a rightward position when cam element is moved to the first position, as indicated by the solid line portion of FIG. 3, and to a leftward position as indicated by the two-dot chain line portion of the same drawing.

As shown most clearly in FIG. 5, a stud 88 fixedly attached to lever element 84 extends into a slot 12 which is provided in the front plate 10a of support bracket 10 and limits the amount of movement of stud 88 and, acting through lever element 84, of cam element 85, to the amount necessary to permit cam element 85 to move to and from the first and second positions, thereby preventing excessive movement of cam element 85 being caused by actuation of switch 81.

In FIGS. 4 and 5, the lower end of lever 84 is in fixed or integral attachment to a connection piece 86 which is generally at right-angles to and extends rearwardly from lever element 84, and the rear end of which is pivotally attached by pin 95 to the right-hand end of actuator bar 94.

In FIG. 3, actuator bar 94 extends in a left-to-right line which is along side and is generally parallel to the light path defined between mirrors 32 and 33 of optical system 30, and the left-hand end thereof is pivotally attached by pin 96 to the lower end of the abovementioned lever 103. Actuator bar 94 may be simply supported by connection piece 86 and lever 103, or may be slidably supported by suitable support block portions not shown. Due to the connection through connection piece 86 and pin 95, when cam element 85 is moved to the first position or second position and the lower end of lever element 84 is moved to a rightward position or to a leftward position the, actuator bar 94 is moved in a straight line rightward or leftward.

In FIGS. 3, 4 and 5, a stud 97, which is fixedly attached to a portion of actuator bar 94 near the right-hand end of bar 94, extends into and is slidable in an elliptical slot 100 defined in a positioning lever 99, which together with stud 97 constitutes part of positioning means 93. Positioning lever 99 is fixedly mounted on shaft 101, which is rotatably mounted in housing wall 9 at a level above that of bar 94. Thus the main portion of lever 99 extends downwardly from shaft 101. A light blockage means, suitably constituted by opaque plate 98, which is made of rigid material and has an area generally equal to that of the light path between mirrors 32 and 33, has one end fixedly attached to the upper end of positioning lever 99 and is disposed at approximately 45° to lever 99. When main switch 81 is actuated to move the cam element 85 to the second position, i.e., to switch on photocopying machine 1, actuator bar 94 is moved leftwards, as noted above, and at the same time stud 97, while sliding in slot 100, causes positioning lever 99 to move to a leftwardly inclined position, and lever 99 causes opaque plate 98 to move to position (B), in which, as indicated by the two-dot chain lines in FIG. 3, it is generally parallel to and does not impede passage of light along the light path defined between mirrors 32 and 33. By a similar action of bar 94 and lever 99, when switch 81 is turned counterclockwise, to switch off photocopying machine 1, and cam element 85 is moved to the first position, opaque plate 98 is moved to position (A), in which as shown by the dashed lines in FIG. 3, it is generally vertical, and in which it prevents passage of light along the light path between mirrors 32 and 33. Thus, even if supplementary cover 23 is not replaced after photocopying a thick original document, once photocopying machine 1 is switched off, there is no possibility of external light being transmitted to photosensitive drum 37 by optical system 30, and hence to risk of change of properties of a particular portion of drum 37 due to prolonged exposure thereof. On the other hand, this risk is eliminated by means having a very simple and compact construction, and demanding no supplementary action by the user of photocopying machine 1.

Figure 6:
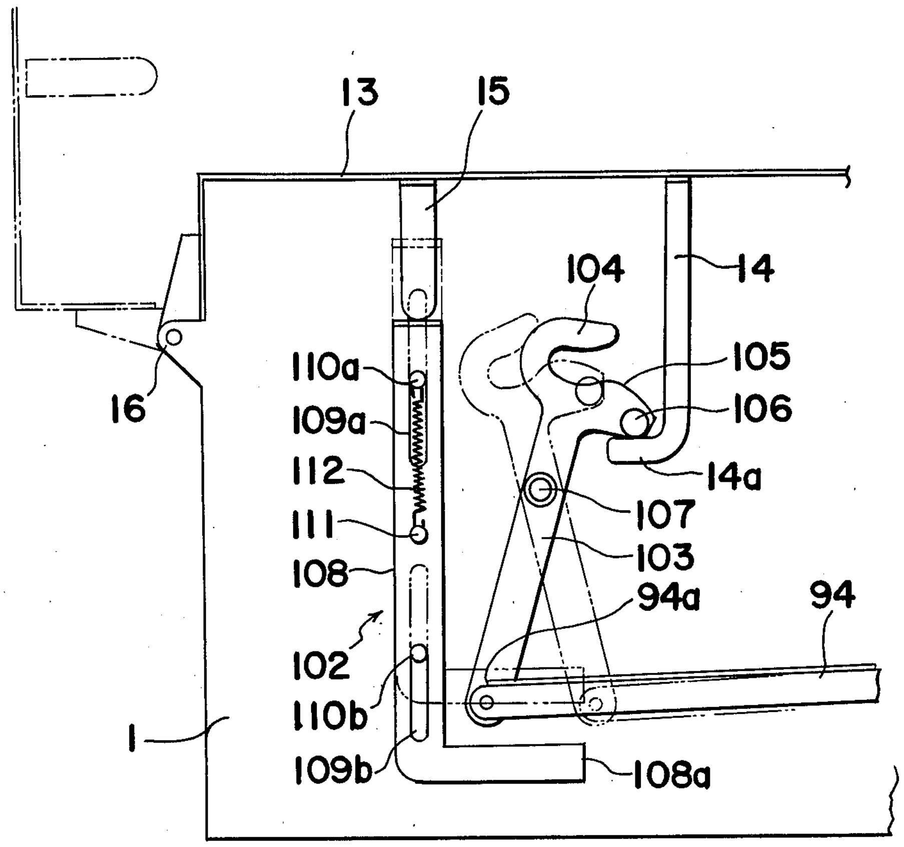
FIG. 6 is a detail side elevation view of cover retainer and switch holder elements employed in the device of the invention.

Referring now to FIG. 6, lever 103, the lower end of which is pivotally connected to the left-hand end of actuator bar 94, has a generally hook-shaped upper end portion 104 and a straight lever portion which is pivotally supported by shaft 107 fixed to housing wall 9, whereby when cam element 85 (FIG. 3) is moved to the first position and bar 94 is moved rightwards, lever 103 is pivoted counterclockwise to a first lever position indicated by the two-dot chain lines in FIG. 6, and when cam element 85 is moved to the second position and bar 94 is moved leftwards lever, 103 is pivoted clockwise to a second lever position indicated by the solid lines in FIG. 6. When lever 103 is in the second lever position, projecting rod 106 which is fixedly attached to a lower portion of the hook-shaped upper end portion 104 of lever 103 engages latch portion **14*a* defined by the bent lower end of a rod 14 which is fixedly attached to and extends vertically downwards from the inner surface of main cover 13. Thus, it is impossible to open cover 13 while cam element 81 is in the second position, i.e., while photocopying machine 1 is switched on. In order to open cover 13 it is first necessary to turn main switch 81 counterclockwise to the off position, and thus move lever 103 to the first lever position, in which projecting rod 106 is out of engagement with latch portion 14*a***.

Still referring to FIG. 6, adjacent lever 103 there is provided slide lever 108 which has two elliptical slots **109*a* and 109*b*, therein, the long axes of which are aligned, and into which respectively project studs 110*a* and 110*b* which are affixed to housing wall 9 in vertical alignment with one another and guide slide lever 108 so as to move up or down in a straight line but not in any other direction. A tension spring 112, which has one end attached to stud 110*a* and the opposite end attached to stud 111 affixed to a generally central portion of slide lever 108, exerts a constant force to move slide lever 108 to the uppermost position, in which, as indicated by the chain-dot lines in the drawing, when actuator bar 94 is in the rightward position, a stop projection defined by the lower end of slide lever 108 will contact the left-hand end of actuator bar 94. When cover 13 is closed, a push rod 15 which is fixedly attached to cover 13 contacts the upper end of slide lever 108 and presses slide lever 108 down, against the force of spring 112, to a lowermost position in which stop projection 108*a* cannot engage actuator bar 94** or other elements.

With this construction, when cover 13 is closed, switch 81 can be moved freely to the on or off position. When cover 13 is opened, however, push rod 15 disengages from slide lever 108 and spring 112 moves slide lever 108 to the position in which stop projection **108*a* is brought into contact with actuator rod 94, which since cover 13 is open, is necessarily in the rightward position, for the above described reasons. Leftward movement of bar 94 is therefore prevented, and, because of the connection through connection piece 86, lever element 84 and cam element 85 (FIG. 3), it is not possible to move main switch 81 clockwise to the on position. In other words, accidental actuation of photocopying machine 1 while cover 13 is open and unrequired actuation of photocopying machine 1 immediately upon reclosure of cover 13** are effectively prevented.

Referring to FIGS. 7 and 8, when photocopying machine 1 is switched off and lever 103 is pivoted counterclockwise due to rightward movement of actuator bar 94, the abovementioned curved upper surface portion 105, which is part of the upper end portion 104 of lever 103, forces roller 46 mounted on transfer unit frame 42 upwards, whereby frame 42 is pivoted clockwise slightly about shaft 72 to a position in which transfer roller 43 no longer contacts photosensitive drum 37, which is therefore protected from possible damage due to contact by transfer roller 43 during nonuse of photocopying machine 1. When photocopying machine 1 is switched on and lever 103 is pivoted clockwise, a lower portion of curved surface 105 is brought into contact with roller 46 and frame 42 moves to the position in which transfer roller 43 contacts drum 37, as shown in FIG. 3.

In this manner, the invention, while employing only very simple elements, achieves the objects of providing protection to easily affected photosensitive material in a photocopying machine and of ensuring safety of the user.

Referring back to FIG. 3, as noted earlier developer fluid reservoir contacts or is connected to rod 106 affixed to lever 103. Counterclockwise pivoting movement of lever 103 when main switch 81 is switched to the off position brings rod 106 to a higher position and rod 106 causes reservoir 60 to pivot clockwise about shaft 62 to a position in which valve 61 is no longer contacted by actuator projection 53 and therefore closes, whereby, while photocopying machine 1 is switched off, unnecessary supply of developer fluid 51 into tank 52, and possible spillage of developer fluid 51 are prevented. When photocopying machine 1 is switched on, lever 103 pivots clockwise to bring rod 106 to a lower position, thus allowing reservoir 60 to pivot anti-clockwise to a horizontal position in which valve 61 is brought into contact with and opened by actuator projection 53, whereby developer fluid 51 is supplied in a required manner to tank 52.

Figure 9:
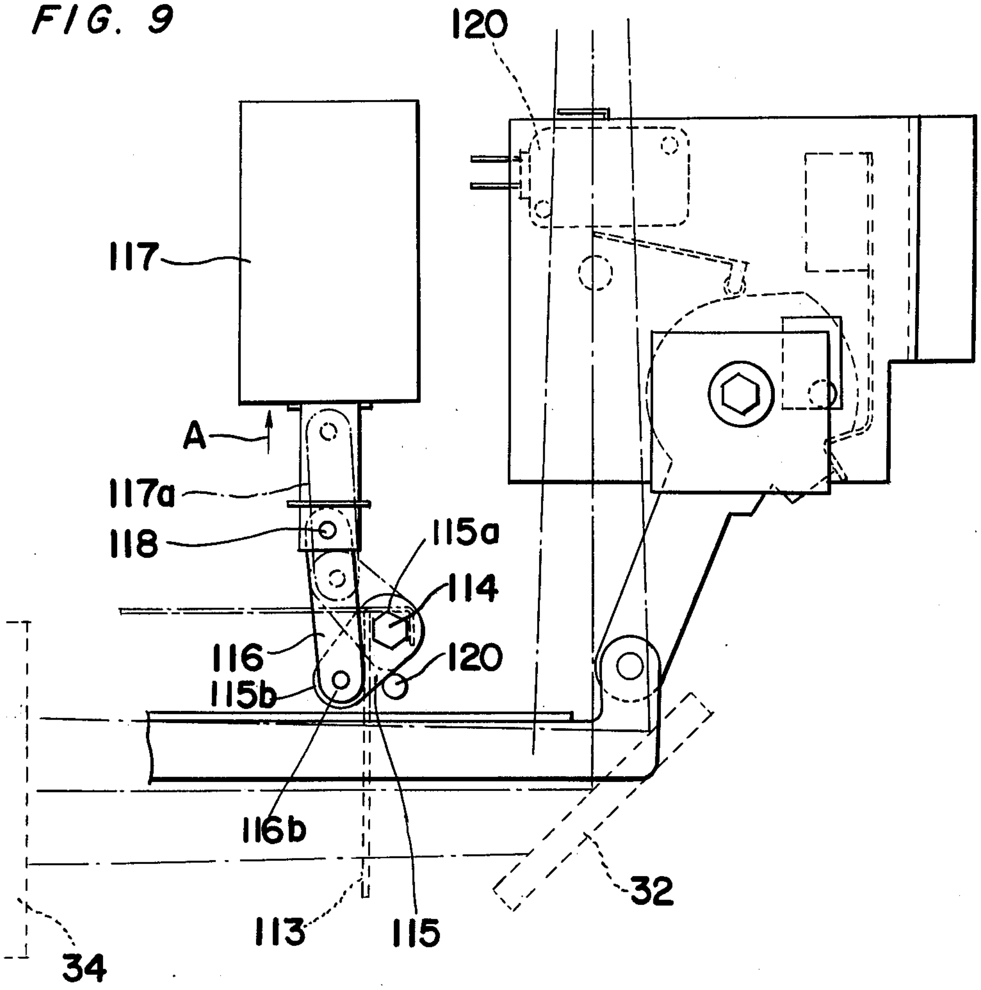
FIG. 9 is a side view of a light blockage means according to another embodiment of the invention.

According to another embodiment of the invention shown in FIG. 9, the light blocking means only is independent of switch 81, and comprises opaque board 113 which has one end fixedly attached to one end **115*a* of and extends at an angle of approximately 45° from, actuation lever 115, the end 115*a* of which is fixedly mounted on support shaft 114 rotatably mounted at a level above that of the light path between mirrors 32 and 33 in a portion of housing 1*a*. The other end 115*b* of actuation lever 115 is in pivotal attachment to one end 116*b* of connection lever 116 the other end of which is pivotally attached by pin 118 to the outer end of plunger 117*a* associated with solenoid 117, solenoid 117 and plunger 117*a* being in vertical alignment and slightly to the left of and above the level of shaft 114. Normally solenoid 117 is unenergized and plunger 117***a* is extended, actuator lever 115 is pivoted counterclockwise, the end 115*b* of actuator lever 115 is moved to a lowermost position, and opaque board 113 is moved to a generally vertical position in which it extends across and prevents passage of light along the light path between mirrors 32 and 33. Downward movement of end 115*b* of lever 115 below a certain point is prevented by stop 120 which is contacted by lever 115 after a certain amount of downward movement thereof. When, however, a photocopying process commences and the above-mentioned light source 31 is actuated, solenoid 117 is energized, plunger 117*a* is drawn in, and actuator lever 115 is pivoted clockwise to an uppermost position, whereby opaque board 113 is moved to a generally horizontal position in which it does not impede passage of light between mirrors 32 and 33.

Figure 10:
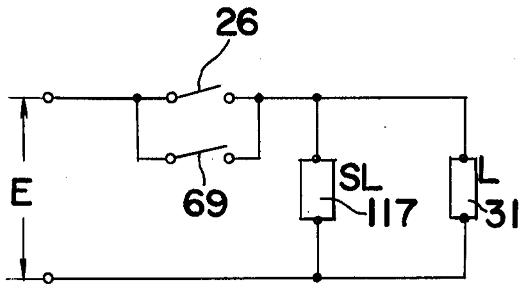
FIGS. 10*a* and 10*b* are circuit drawings of electrical circuits employable in the means of FIG. 9.
Figure 10B:
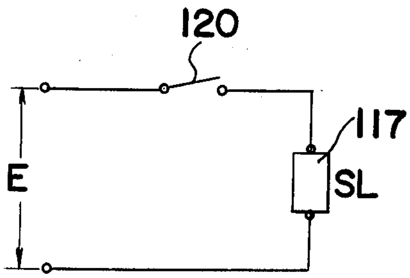

In FIG. 10, actuation of solenoid 117 simultaneously with light source 31 can be effected for example by providing these elements in parallel with one another in a circuit which is actuatable by voltage source E and is closed upon closure of either of the abovementioned microswitches 26 or 69, as shown in FIG. 10*a*, or by providing solenoid 117 in series with voltage source E in a circuit which is closed by switch 120', which is actuated in response to actuation of microswitch 91, as shown in FIG. 10*b*.

In addition thereto, further changes and modifications will be apparent to those skilled in the art upon reading of the description of the present invention with or without reference to the accompanying drawings. Therefore, these changes and modifications are to be construed as being included within the true scope of the present invention unless they depart therefrom.

What is claimed is:

1. In a photocopying machine wherein light from an original document to be copied and scanned by light from a light source is directed by an optical system along a light path leading to an electrophotosensitive medium which is exposed to the light to form an electrostatic latent image of the original document thereon, said medium being moved in a path disposed within a machine housing, and an image of the original document formed on said electrophotosensitive medium is transferred onto a copy paper, and said machine having a power source and a portion movable from a closed position against the machine housing to an open position, the improvement comprising:

switch means actuable to switch said power source on and off;

light blocking means provided adjacent said light path and movable to a first position wherein said blocking means blocks passage of light along said light path and to a second position wherein said blocking means is out of said light path;

lock means actuable to lock said portion of the machine in the closed position; and control means for interlocking said switch means with said light blocking means and lock means for moving said blocking means to said second position when said switch means is moved to the position for turning said power source on and moving said blocking means to said first position when said switch means is moved to the position for turning said power source off, and for actuating said lock means for locking said portion of the machine against movement to the open position only when said switch means is moved to the position for turning said power source on and said switch means being movable to switch the power source on only when said portion of the machine is in the closed position.

2. In a photocopying machine wherein light from an original document to be copied and scanned by light from a light source is directed by an optical system along a light path leading to an electrophotosensitive drum which is exposed to the light to form an electrostatic latent image of the original document thereon, said drum being rotatable within a main housing, and an image of the original document formed on said electrophotosensitive drum is transferred onto a copy paper, and said machine having a power source the improvement comprising:

light blocking means provided adjacent said light path and movable to a first position wherein said blocking means blocks passage of light along said light path and to a second position wherein said blocking means is out of said light path; and control means for moving said blocking means to said second position when said light source is on and moving said blocking means to said first position when said light source is off; and rollers on said housing for feeding a document to be copied past the light source, a frame means mounted over said rollers for movement toward and away from said rollers and having further rollers opposed to said firstmentioned rollers for conveying a single sheet document to be copied, whereby when said frame means is moved away from said firstmentioned rollers a thick document can be conveyed on a separate plate on said firstmentioned rollers.

3. A photocopying machine as claimed in claim 2, wherein said electrophotosensitive drum is rotatable when the power source of the machine is on, and said control means further comprises means for interlinking said blocking means with the power source for moving the blocking means to said second position when the power source is on.

4. In a photocopying machine wherein light from an original document to be copied and scanned by light from a light source is directed by an optical system along a light path leading to an electrophotosensitive drum which is exposed to the light to form an electrostatic latent image of the original document thereon, said drum being rotatable within a main housing, and an image of the original document formed on said electrophotosensitive drum is transferred onto a copy paper, and said machine having a power source, the improvement comprising:

light blocking means provided adjacent said light path and movable to a first position wherein said blocking means blocks passage of light along said light path and to a second position wherein said blocking means is out of said light path;

control means for interlocking said light blocking means and said power source for moving said blocking means to said second position when said power source is on for rotating said drum and moving said blocking means to said first position when said power source is off; and rollers on said housing for feeding a document to be copied past the light source, a frame means mounted over said rollers for movement toward and away from said rollers and having further rollers opposed to said firstmentioned rollers for conveying a single sheet document to be copied, whereby when said frame means is moved away from said firstmentioned rollers a thick document can be conveyed on a separate plate on said firstmentioned rollers.

5. In a photocopying machine having a photosensitive medium on which can be defined a latent image of an original document, means defining an exposure station whereat at least part of said photosensitive medium is exposed to image carrying light coming from an original document, means defining a projection station whereat an original document is supported and from which image carrying light from at least a portion of said original document is projected onto said photosensitive medium, illumination means actuable to illuminate an original document at said projection station, an optical system for directing image carrying light from an original document at said projection station along a light path leading from said projection station to said exposure station, transfer means actuable to effect transfer onto copy paper of an image carried by said photosensitive medium, development means actuable to effect development of an image carried by said photosensitive medium or said copy paper, a main housing in which are supported said means defining said projection station and said photosensitive medium, said optical system, and said development means, and said main housing including a main cover which is movable to a closed position to enclose the respective means accommodated in said housing and to an open position to uncover said respective means, control circuit means for actuation of said photocopying machine, and a main switch means which is externally controllable, and is movable to an on-position to cause power to be supplied to and to close said control circuit means and to an off-position to stop supply of power to and to open said control circuit means, a photocopying machine protection and safety device comprising:

light blocking means positioned adjacent said optical system and movable to a blocking position wherein said blocking means blocks passage of light along said light path and to a non-blocking position wherein said blocking means is out of said light path; and externally actuable control means connected to said blocking means for controlling at least the position of said blocking means and which is movable to a first position in which said control means moves said blocking means to said non-blocking position when power is supplied and to a second position in which said control means moves said blocking means to said blocking position when the supply of power is stopped.

6. A photocopying machine as claimed in claim 5, wherein said externally actuable control means comprises an interlocking mechanism connected to said main switch means which moves said light blocking means to said non-blocking position when said main switch means is moved to said on-position and to said blocking position when said main switch means is moved to said off-position.

7. A photocopying machine as claimed in claim 6, further including toner carrying developer supply means having at least one opening for supplying developing fluid with toner, said interlocking mechanism being connected with said toner carrying developer supply means for manipulating said toner carrying developer supply means for closing said opening for supplying developing fluid with toner when said main switch means is moved to said off-position.

8. A photocopying machine as claimed in claim 6, wherein said interlocking mechanism comprises an operational member for actuating said main switch means to selectively move said main switch means to said on-position and to said off-position, a lever member connected to said operational member, and said light blocking means including a shutting board which is connected to said lever member for movement thereby.

9. In a photocopying machine having a photosensitive medium on which can be defined a latent image of an original document, means defining an exposure station whereat at least part of said photosensitive medium is exposed to image carrying light coming from an original document, means defining a projection station whereat an original document is supported and from which image carrying light from at least a portion of said original document is projected onto said photosensitive medium, illumination means actuable to illuminate an original document at said projection station, an optical system for directing image carrying light from an original document at said projection station along a light path leading from said projection station to said exposure station, transfer means actuable to effect transfer onto copy paper of an image carried by said photosensitive medium, development means actuable to effect development of an image carried by said photosensitive medium or said copy paper, a main housing in which are supported said means defining said projection station and said photosensitive medium, said optical system, and said development means, and said main housing including a main cover which is movable to a closed position to enclose the respective means accommodated in said housing and to an open position to uncover said respective means, control circuit means for actuation of said photocopying machine, and a main switch means which is externally controllable, and is movable to an on-position to cause power to be supplied to and to close said control circuit means and to an off-position to stop supply of power to and to open said control circuit means, a photocopying machine protection and safety device comprising:

light blocking means positioned adjacent said optical system and movable to a blocking position wherein said blocking means blocks passage of light along said light path and to a non-blocking position wherein said blocking means is out of said light path; and externally actuable control means connected to said blocking means for controlling at least the position of said blocking means and which is movable to a first position in which said control means moves said blocking means to said non-blocking position when power is supplied and to a second position in which said control means moves said blocking means to said blocking position when the supply of power is stopped, said main cover having a latch element and said control means having a hook element which engages said latch element and prevents opening of said cover when said control means is in said first position and is disengaged from said latch element when said control means is in said second position, whereby said cover can be opened.

10. In a photocopying machine having a photosensitive medium on which can be defined a latent image of an original document, means defining an exposure station whereat at least part of said photosensitive medium is exposed to image carrying light coming from an original document, means defining a projection station whereat an original document is supported and from which image carrying light from at least a portion of said original document is projected onto said photosensitive medium, illumination means actuable to illuminate an original document at said projection station, an optical system for directing image carrying light from an original document at said projection station along a light path leading from said projection station to said exposure station, transfer means actuable to effect transfer onto copy paper of an image carried by said photosensitive medium, development means actuable to effect development of an image carried by said photosensitive medium or said copy paper, a main housing in which are supported said means defining said projection station and said photosensitive medium, said optical system, and said development means, and said main housing including a main cover which is movable to a closed position to enclose the respective means accommodated in said housing and to an open position to uncover said respective means, control circuit means for actuation of said photocopying machine, and a main switch means which is externally controllable, and is movable to an on-position to cause power to be supplied to and to close said control circuit means and to an off-position to stop supply of power to and to open said control circuit means, a photocopying machine protection and safety device comprising:

light blocking means positioned adjacent said optical system and movable to a blocking position wherein said blocking means blocks passage of light along said light path and to a non-blocking position wherein said blocking means is out of said light path; and externally actuable control means connected to said blocking means for controlling at least the position of said blocking means and which is movable to a first position in which said control means moves said blocking means to said non-blocking position when power is supplied and to a second position in which said control means moves said blocking means to said blocking position when the supply of power is stopped, said control means and said main switch means being in interlocked connection for moving said control means to said first position when said switch means is moved to said on position and to said second position when said switch means is moved to said off position;

a slide element slidably supported in a portion of said housing and movable to a first slide element position in which said slide element engages and prevents movement of said control means and to a second slide element position in which said slide element is out of engagement with said control means;

spring means engaged with said slide element exerting constant force to move said slide element to said first slide element position; and a push element attached to said main cover for engaging said slide element and moving said slide element against the force of said spring means to said second slide element position when said cover is closed, and movable out of engagement with said slide element when said cover is in said open position.

* * * * *